(12) United States Patent
Moriguchi

(10) Patent No.: US 6,273,821 B1
(45) Date of Patent: Aug. 14, 2001

(54) GAME SYSTEM, GAME DATA DISTRIBUTION MACHINE, GAME MACHINE, IMAGE DISPLAY SYSTEM, AND COMPUTER-USABLE INFORMATION

(75) Inventor: Akihiko Moriguchi, Yokohama (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/622,308
(22) PCT Filed: Dec. 24, 1999
(86) PCT No.: PCT/JP99/07274
§ 371 Date: Sep. 20, 2000
§ 102(e) Date: Sep. 20, 2000

(30) Foreign Application Priority Data

Dec. 25, 1998 (JP) .................................................. 10-370087

(51) Int. Cl.[7] ............................. A63F 13/00; A63F 13/12
(52) U.S. Cl. ................................. 463/42; 463/40; 463/42
(58) Field of Search .................................... 463/42, 43, 40, 463/1; 709/218; 370/389; 345/355; 395/200.39

(56) References Cited

U.S. PATENT DOCUMENTS

| | | | |
|---|---|---|---|
| 5,695,400 | * | 12/1997 | Fennell, Jr. et al. ................... 463/42 |
| 5,838,909 | * | 11/1998 | Roy et al. ........................ 395/200.39 |
| 5,899,810 | * | 5/1999 | Smith ..................................... 463/42 |
| 6,042,477 | * | 3/2000 | Addink .................................. 463/42 |
| 6,064,673 | * | 5/2000 | Anderson et al. .................... 370/389 |
| 6,104,392 | * | 8/2000 | Shaw et al. .......................... 345/355 |
| 6,182,125 | * | 1/2001 | Borella et al. ....................... 709/218 |

FOREIGN PATENT DOCUMENTS

| | | |
|---|---|---|
| 9-294260 | 11/1997 | (JP) . |
| 10-240604 | 9/1998 | (JP) . |

* cited by examiner

Primary Examiner—Jessica J. Harrison
Assistant Examiner—Yveste G. Cherubin
(74) Attorney, Agent, or Firm—Oliff & Berridge, PLC

(57) ABSTRACT

A game system, a game data distribution machine, a game machine, and computer-usable information that make it possible to increase the efficiency of the compression and transfer of images that are otherwise difficult to compress efficiently. Distribution data that comprises image identification data 122 for determining whether or not an image is a special image is transmitted from a game data distribution machine 100 and, if the distribution data indicates that this is a request for the display of a special image, special image data 242 that has been stored previously in a storage section 240 is read out, and the special image that is provided instead of a real-time game image is displayed by an image display section 220.

31 Claims, 11 Drawing Sheets

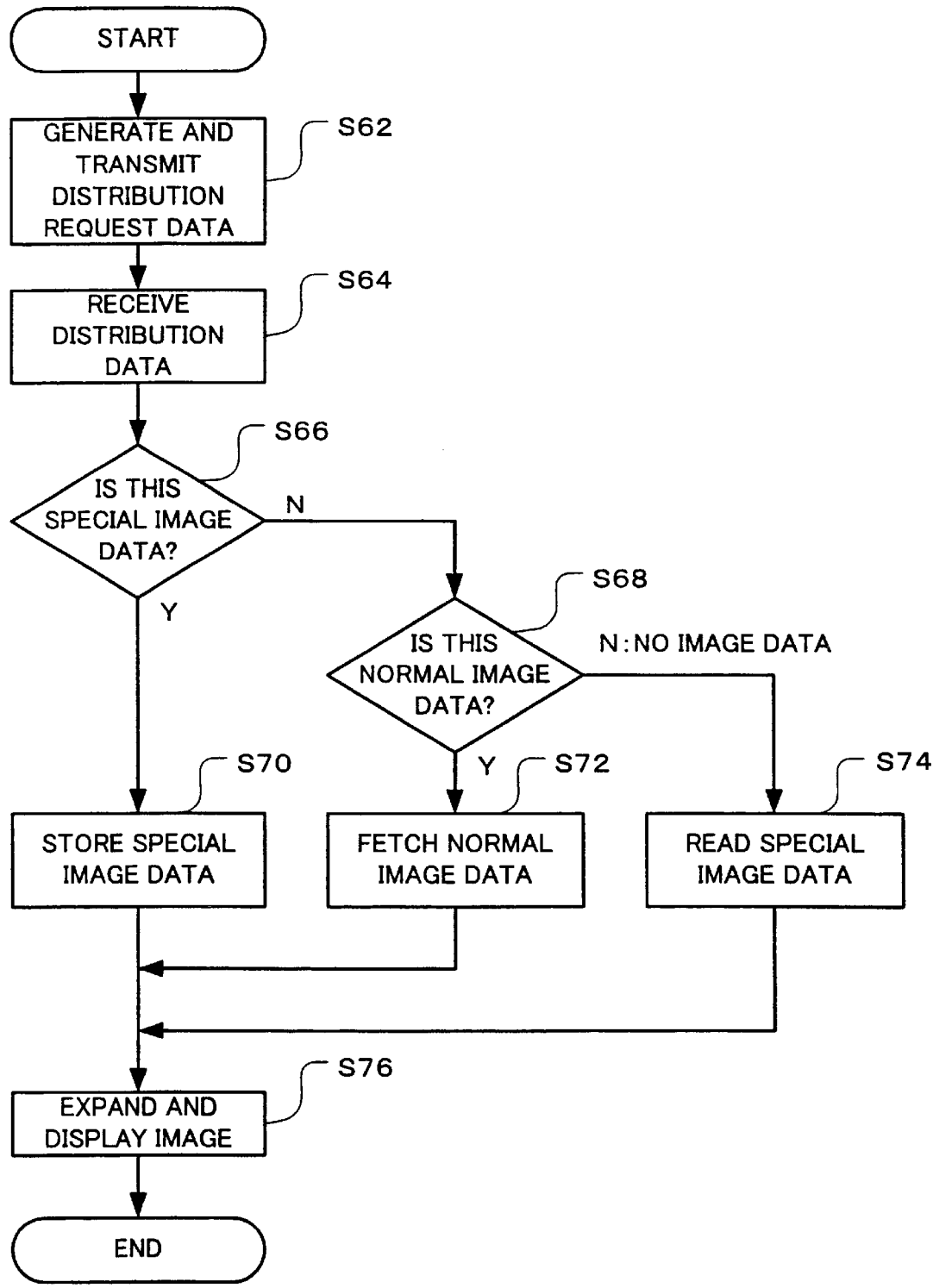

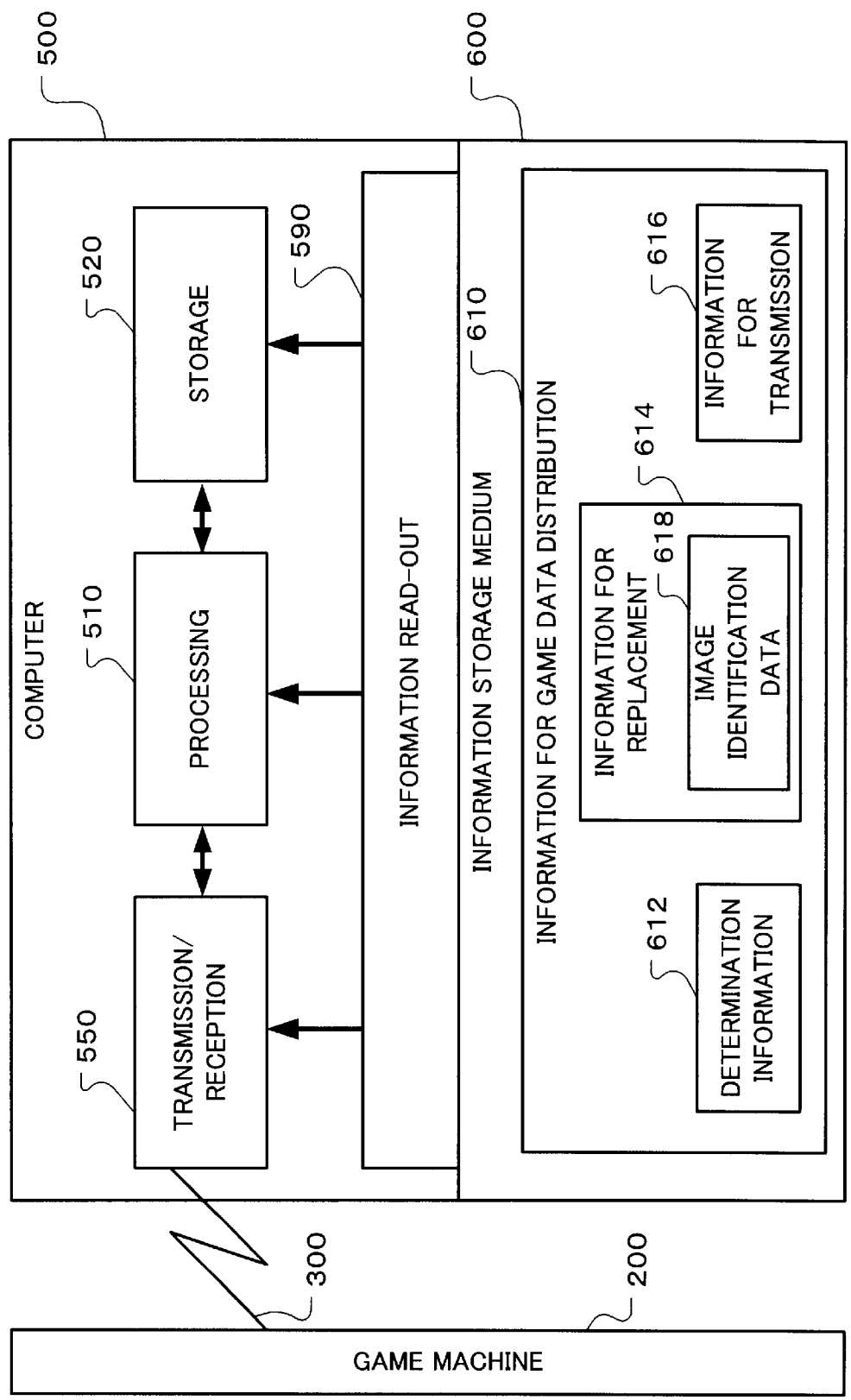

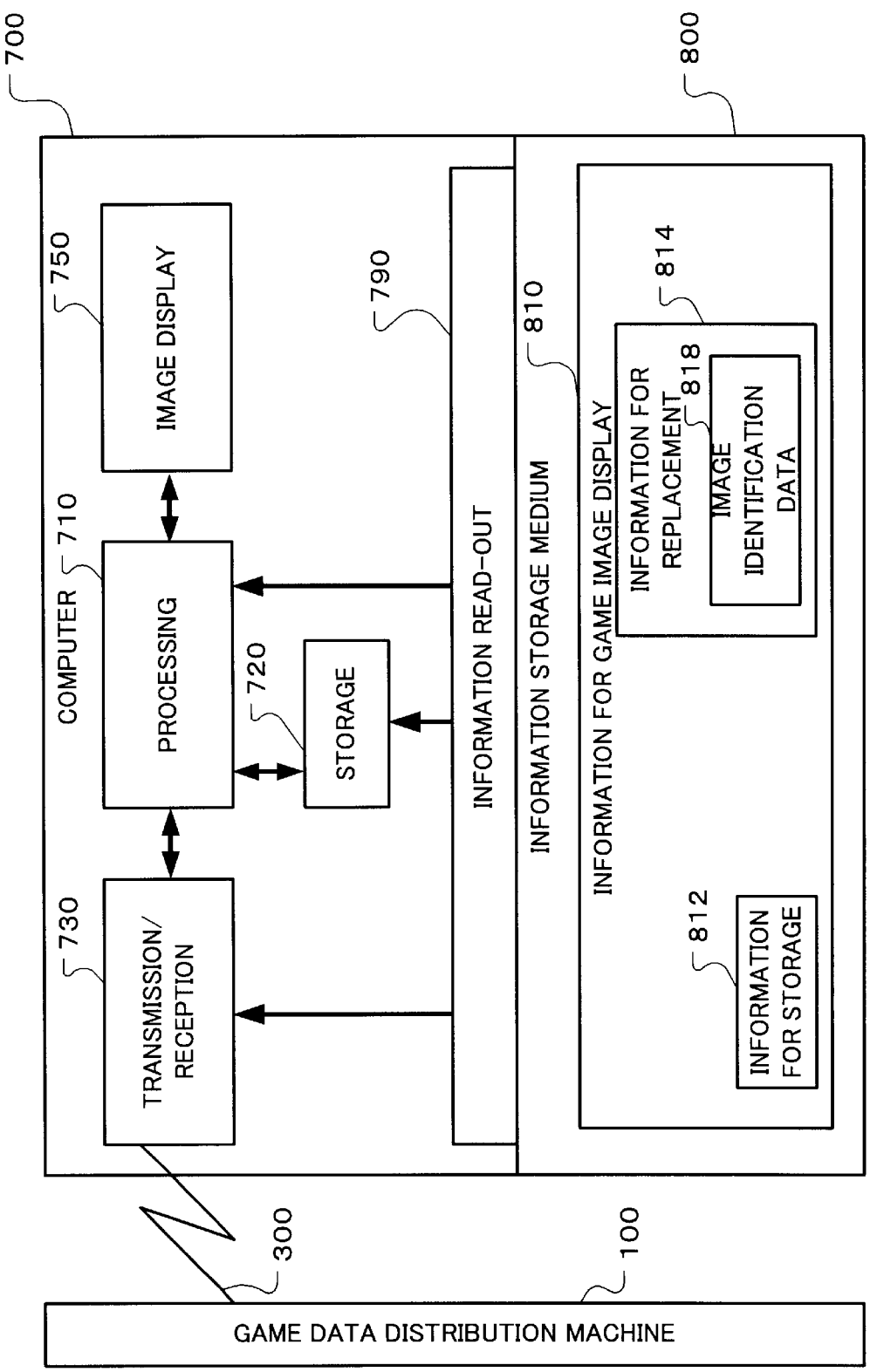

GAME SYSTEM, GAME DATA DISTRIBUTION MACHINE, GAME MACHINE, IMAGE DISPLAY SYSTEM, AND COMPUTER-USABLE INFORMATION

TECHNICAL FIELD

The present invention relates to a game system, a game data distribution machine, a game machine, and computer-usable information storage medium.

BACKGROUND ART

In an image display system that displays images that have been produced by another processing device in real time over a transmission path, various factors such as restrictions on transfer bandwidth dictate that images are compressed for transfer then the image data is expanded for display by a processing device at the transfer destination.

However, such compression is not particularly effective with some images. One example of such an image is a special image in which adjacent pixels have greatly different properties, such as a demo image in which a game character and a large amount of lettering are mixed together to form a game image. When a special image of this type is transferred, the corresponding image data takes up the entire transfer bandwidth and has a low transfer efficiency.

The present invention was devised in the light of this technical problem and has as an objective thereof the provision of a game system, a game data distribution machine, game machine, an image display system, and computer-usable information that make it possible to increase the efficiency of the compression and transfer of images that are otherwise difficult to compress efficiently.

DISCLOSURE OF THE INVENTION (1) A game system in accordance with the present invention comprises:
  a game machine for transmitting distribution request data and also displaying a game image based on predetermined distribution data, to present a game; and
  a game data distribution machine for generating the distribution data, based on distribution request data that is transmitted over a transmission path from the game machine, and transmitting the game image data to the game machine;
  wherein the game data distribution machine comprises:
  means for receiving the distribution request data from the game machine;
  means for generating game image data, based on received distribution request data; and
  means that operates if the thus generated game image data is special image data for the display of a predetermined special image, for generating distribution data that comprises image identification data indicating that the game image data is the special image data, and transmitting the generated distribution data to the game machine; and
  wherein the game machine comprises:
  means for generating the distribution request data on the basis of operating information, transmitting the thus generated distribution request data to the game data distribution machine, and receiving the distribution data from the game data distribution machine;
  means for determining an image type, based on the image identification data comprised within received distribution data; and
  means that operates if it has been determined that the special image data has been distributed, for displaying the special image, based on the special image data that has been stored in a predetermined storage area.

(2) A game data distribution machine in accordance with the present invention for transmitting distribution data that comprises game image data over a transmission path, comprises:
  distribution-side determination means for determining whether or not the game image data is special image data having a data volume that exceeds a predetermined volume of data; and
  distribution-side transmission means that operates if it has been determined that the game image data is the special image data, for generating the distribution data that comprises image identification data indicating that the game image data is the special image data instead of the game image data, and transmitting the distribution data to a game machine which stores the special image data and is presenting a game.

(3) Another game data distribution machine in accordance with the present invention for transmitting distribution data that comprises game image data over a transmission path, comprises:
  a distribution-side determination circuit for determining whether or not the game image data is special image data having a data volume that exceeds a predetermined volume of data; and
  a distribution-side transmission circuit that operates if it has been determined that the game image data is the special image data, for generating the distribution data that comprises image identification data indicating that the game image data is the special image data instead of the game image data, and transmitting the distribution data to a game machine which stores the special image data and is presenting a game.

(4) A game machine in accordance with the present invention that receives distribution data that comprises game image data over a transmission path from a game data distribution machine, to display a game image, comprises:
  means for determining whether or not received distribution data comprises image identification data indicating that the display of a predetermined special image is requested; and
  means that operates if it has been determined that the distribution data comprises the image identification data, for displaying the game image, based on special image data for displaying the special image that is stored in a predetermined storage area, instead of the game image data.

(5) Computer-usable information in accordance with the present invention embodied on an information storage medium or in a carrier wave, for transmitting distribution data that comprises game image data over a transmission path, comprises:
  determination information for determining whether or not the game image data is special image data having a data volume that exceeds a predetermined volume of data; and
  information that is used if it has been determined that the game image data is the special image data, for making transmission means transmit the distribution data that comprises image identification data indicating that the game image data is the special image data to a game machine at which the special image data is stored, instead of the game image data.

(6) Another type of computer-usable information in accordance with the present invention embodied on an information storage medium or in a carrier wave, for displaying a game image, based on distribution data that comprises game image data transferred over a transmission path from a game data distribution machine, comprises:

information for previously storing special image data that is part of the image data in a predetermined storage area before the reception of the distribution data; and information that is used if received distribution data comprises predetermined image identification data, for displaying a special image, based on the special image data in the storage area instead of the game image data.

The above-described aspects of this invention enable a device on the reception side of distribution data to determine whether or not a special image is to be displayed, from image identification data that is comprised within the received distribution data, then read special image data from a predetermined storage area instead of the distribution data, for display.

If the special image data is extracted from the distribution data, it could happen that the transfer of the special image data will make the special image data occupy the entire transfer bandwidth, or will make the transferred data volume exceed the data volume allotted to the transfer bandwidth, making it impossible to display the image in real time. The present invention makes it unnecessary to transmit special image data, enabling a smooth display of images in real time.

Note that the special image data in this case corresponds to image data in which there are large differences in the properties of adjacent pixels (such as lightness and chroma), or between frames, such as in flash scenes.

(7) Another game system in accordance with the present invention comprises:

a game machine for transmitting distribution request data and also displaying a game image based on predetermined distribution data, to present a game; and a game data distribution machine for transmitting to the game machine distribution data that comprises game image data which is generated on the basis of the distribution request data from the game machine that is transmitted over a transmission path;

wherein the game data distribution machine comprises:

means for receiving the distribution request data from the game machine;

means for generating the game image data, based on received distribution request data;

distribution-side determination means for determining whether or not the thus generated game image data is special image data for displaying a predetermined special image; and distribution-side transmission means that operates if it has been determined that the game image data has been the special image data, for generating distribution data that comprises the special image data, transmitting the distribution data to the game machine, further generating distribution data that comprises image identification data indicating that the game image data is the special image data instead of the special image data for subsequent transfers, and transmitting the distribution data to the game machine; and wherein the game machine comprises:

means for generating the distribution request data on the basis of operating information, transmitting the distribution request data to the game data distribution machine, and receiving the distribution data from the game data distribution machine;

means for storing in a predetermined storage area the special image data comprised within the distribution data that is transmitted from the game data distribution machine;

means for determining an image type, based on the image identification data comprised within received distribution data; and means that operates if it has been determined that the special image data has been distributed, for displaying the special image, based on the special image data stored in the storage area.

(8) A further game data distribution machine in accordance with the present invention for transmitting distribution data that comprises game image data over a transmission path to a game machine which is presenting a game, comprises:

determination means for determining whether or not the game image data is special image data that requires a processing time longer than a predetermined processing time; and means that operates if it has been determined that the game image data is the special image data, for generating the distribution data that comprises the special image data, transmitting the distribution data to the game machine, further generating distribution data that comprises image identification data indicating that the game image data is the special image data instead of the special image data for subsequent transfers, and transmitting the distribution data to the game machine.

(9) A yet further game data distribution machine in accordance with the present invention for transmitting distribution data that comprises game image data over a transmission path to a game machine which is presenting a game, comprises:

a determination circuit for determining whether or not the game image data is special image data that requires a processing time longer than a predetermined processing time; and a circuit that operates if it has been determined that the game image data is the special image data, for generating the distribution data that comprises special image data, transmitting the distribution data to the game machine, further generating distribution data that comprises image identification data indicating that the game image data is the special image data instead of the special image data for subsequent transfers, and transmitting the distribution data to the game machine.

(10) An image display system in accordance with the present invention for receiving distribution data including predetermined image data over a transmission path from an image processing device, and for displaying a predetermined image, comprises:

means for storing special image data for the display of a predetermined special image in a predetermined storage area before the reception of the distribution data;

means for determining whether or not received distribution data comprises image identification data indicating that the display of the special image is requested; and means that operates if it has been determined that the distribution data comprises the image identification data identifying that the display of the special image is requested, for displaying the special image, based on the special image data in the storage area instead of the predetermined image data.

(11) Another type of information in accordance with the present invention embodied on an information storage medium or in a carrier wave, for transmitting distribution data that comprises game image data to a game machine over a transmission path, comprises:

information for determining whether or not the game image data is special image data that requires a processing time longer than a predetermined processing time; and information for transmission that is used if it has been determined that the game image data is special image data, for making transmission means transmit the distribution data that comprises the special image data to the game machine, and for making the transmission means transmit the distribution data including image identification data indicating that the game image data is the special image data to the game machine, instead of the special image data, for subsequent transmissions.

(12) A further type of information in accordance with the present invention embodied on an information storage medium or in a carrier wave, for displaying a game image, based on distribution data that comprises game image data transferred over a transmission path from a game data distribution machine, comprises:

information for use if received distribution data includes special image data, for storing the special image data in a predetermined storage area; and information for use if received distribution data includes predetermined image identification data indicating that the game image data is the special image data, for displaying a special image, based on the special image data in the storage area instead of the game image data.

In the above-described aspects of this invention, a transmission-side device transfers distribution data that comprises special image data only once, then transmits distribution data that comprises image identification data identifying that special image data instead of the special image data itself during subsequent transmissions.

This makes it possible to reduce the monopolization of the transfer bandwidth by the data transfer, in comparison with a case in which special image data is transferred every time, and, since the transmission-side device can transmit distribution data comprising the image identification data to the reception-side device even more rapidly, the reception side device can display images in real time.

The transmission side device can modify the special image data in a simple manner on the transmission side, by transmitting the special image data only once, in comparison with a method in which no special image data is transmitted. This makes it possible to change the specifications of the special image data in a flexible and also rapid manner.

Note that processing time in this case refers to the time required for generating, compressing, and transmitting data.

This makes it possible to determine whether or not the data is special image data, based on the processing time. This enables a reduction in the determination time, in comparison with a technique of determining the image type from the contents of the image.

In other words, special image data takes longer to process than normal image data. Furthermore, different items of special image data have different processing times. It is therefore possible to use that property to determine whether or not the data is special image data from the processing time alone.

(13) In the game system in accordance with the present invention, the special image data may be predetermined image data for real-time display.

(14) In the game data distribution machine in accordance with the present invention, the special image data may be predetermined image data for real-time display.

(15) In the computer-usable information in accordance with the present invention, the special image data may be predetermined image data for real-time display.

If the special image data is predetermined, the reception-side device can simply store that data in a storage area on the reception side beforehand. Note that special images of this type include a game entry image, a demo image, or an ending image, by way of example. Note that a special image could be a still image or a moving image.

Even if the special image data is not predetermined, the reception-side device can still display a special image in real time by storing the special image data in the storage area when it is received for the first time.

(16) In the game system in accordance with the present invention, the game data distribution machine may further comprise means for compressing the game image data before the transmission of the distribution data; and the game machine may further comprise means for expanding the game image data comprised within received distribution data.

(17) The game data distribution machine in accordance with the present invention may further comprise means for compressing the game image data before the transmission of the distribution data.

(18) The computer-usable information in accordance with the present invention may further comprise information for compressing the game image data before the transmission of the distribution data.

The above-described aspects of this invention enable a reduction in the monopolization of the transfer bandwidth of the transmission path in comparison with a case in which there is no compression, by having the distribution-side device transmit the game image data after compressing it, which makes it possible to transmit that game image data rapidly, and also makes it possible for the reception-side device to expand and display the images rapidly.

(19) In the game system in accordance with the present invention, the special image data may have a data volume in a compressed state that exceeds the predetermined volume of compressed data for a normal image.

(20) In the game data distribution machine in accordance with the present invention, the special image data may have a data volume in a compressed state that exceeds the predetermined volume of compressed data for a normal image.

(21) In the computer-usable information in accordance with the present invention, the special image data may have a data volume in a compressed state that exceeds the predetermined volume of compressed data for a normal image.

The distribution-side device can determine whether or not the image data is special image data in a simple manner, by comparing the volume of data in the compressed state.

(22) In the game system in accordance with the present invention, the game data distribution machine may further comprise means for monitoring the volume of data transferred over the transmission path and detecting a transfer state; and the distribution-side transmission means may transmit distribution data that comprises the special image data in a state in which a predetermined amount of space remains available in a transfer bandwidth within the transmission path.

(23) The game data distribution machine in accordance with the present invention may further comprise means for monitoring the volume of data transferred over the transmission path and detecting a transfer state; and the distribution-side transmission means may transmit distribution data that comprises the special image data in a state in which a predetermined amount of space remains available in a transfer bandwidth within the transmission path.

(24) The computer-usable information in accordance with the present invention may further comprise information for monitoring the volume of data transferred over the transmission path and detecting a transfer state; and the information for transmission may include information for transmitting distribution data that comprises the special image data in a state in which a predetermined amount of space remains available in a transfer bandwidth within the transmission path.

The above-described aspects of this invention ensure that there is sufficient available space in the transfer bandwidth when the distribution-side device transfers the special image data. Therefore, it becomes difficult to occur that the transfer of other normal image data is delayed during the transfer of the special image data, for example, and thus the reception-side device can display images in real time.

(25) In the game system in accordance with the present invention, the distribution-side determination means may comprise means for extracting a feature portion of the game image data, wherein the determination is based on the thus-extracted feature portion of the game image data.

(26) In the game data distribution machine in accordance with the present invention, the distribution-side determination means may comprise means for extracting a feature portion of the game image data, wherein the determination is based on the thus-extracted feature portion of the game image data.

(27) In the computer-usable information in accordance with the present invention, the determination information may further comprise information for extracting a feature portion from the game image data, and information for determining the special image data, based on the thus-extracted feature portion of the game image data.

Since it is sufficient to use only a feature portion, not an entire image, for the distribution-side device to determine whether or not data is special image data, the determination can be done more efficiently.

(28) The game data distribution machine in accordance with the present invention may further comprise image generation means for generating the game image data, based on distribution request data from the game machine.

(29) The game data distribution machine in accordance with the present invention may further comprise image generation means for generating the game image data, based on distribution request data from the game machine.

The above-described aspects of this invention enable the game data distribution machine to generate a wide range of game images for distribution to the game machines in response to requests from the game machines.

(30) In the game data distribution machine in accordance with the present invention, the distribution request data may comprise operating information for the game machine; and the image generation means may perform game computations based on the operating information.

(31) In the game data distribution machine in accordance with the present invention, the distribution request data may comprise operating information for the game machine; and the image generation means may perform game computations based on the operating information.

The above-described aspects of this invention enable the game data distribution machine to generate a wide range of game images for distribution to the game machines in response to the operations of the game players, by performing game computations on the basis of operating information from the game players or the like.

BRIEF DESCRIPTION OF DRAWINGS

FIG. 6 shows examples of images displayed on the game screen when a winner has been determined in a racing game, where

FIG. 8 is a flowchart of the processing performed up to game image display by a game machine 200.

FIG. 9 shows the data structure of distribution data, where

FIG. 10 is a functional block diagram of a computer that functions as a game data distribution machine, and an information storage medium.

FIG. 11 is a functional block diagram of a computer that functions as a game machine, and an information storage medium.

BEST MODE FOR CARRYING OUT THE INVENTION

The description now turns to specific embodiments to which the present invention is applied, with reference to the accompanying drawings.

First of all, the present invention is described with reference to a game system in which a game data distribution machine for distributing game image data is connected by a network that includes transmission paths to a plurality of game machines for displaying game images that are based on game image data, to enable a game to be played in real time while images displayed on various processing devices are synchronized.

Figure 1:
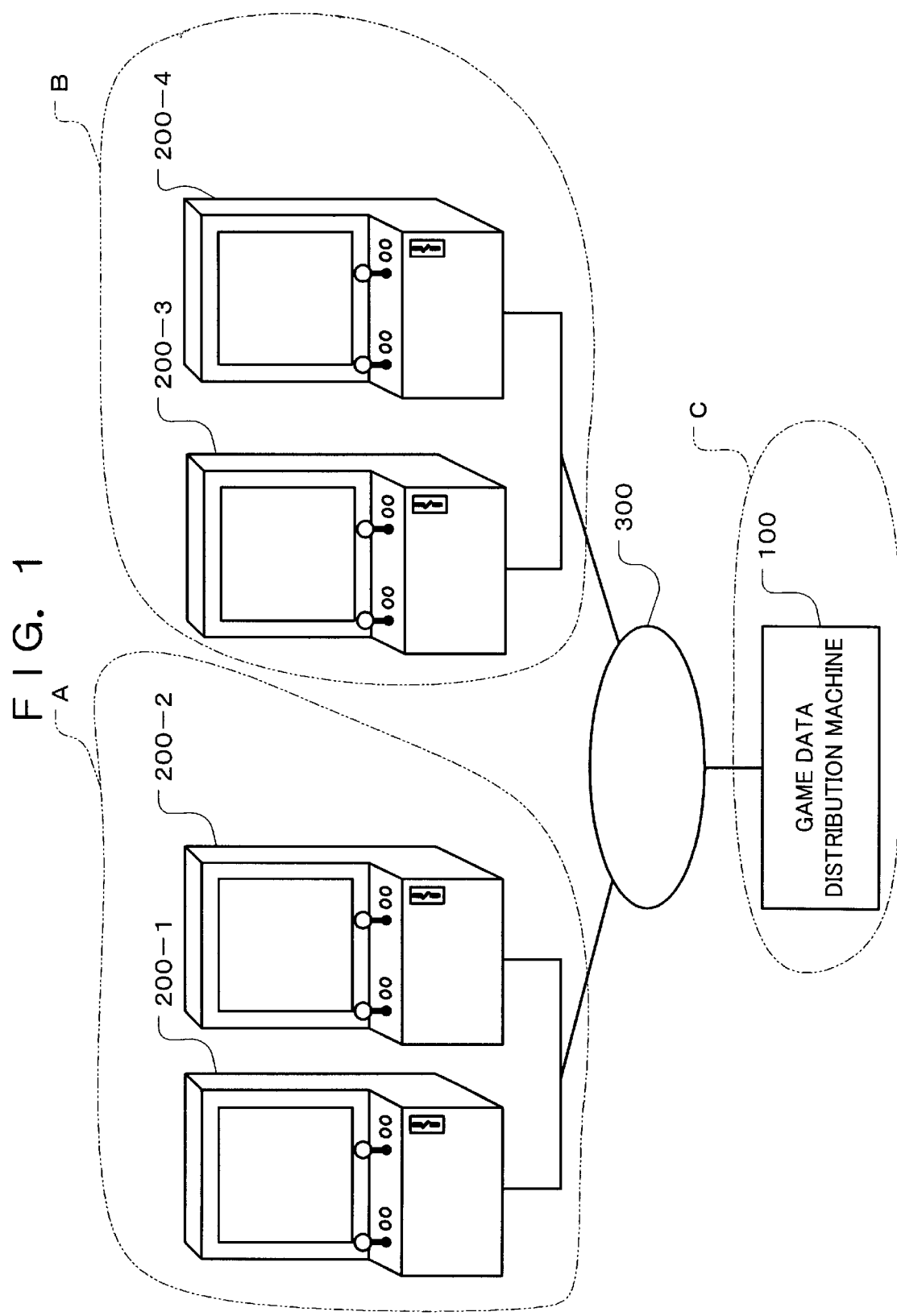
FIG. 1 shows an example of a game system in accordance with an embodiment of this invention.

An example of a game system in accordance with this invention is shown in FIG. 1.

With this game system, a site C at which a game data distribution machine 100 is located, a site A at which game machines 200-1 and 200-2 are located, and a site B at which game machines 200-3 and 200-4 are located are connected together by an asynchronous transfer mode (ATM) network that comprises communications lines 300 as a transmission path.

A networked multi-player game is played by transferring image data from the game data distribution machine 100 to the various game machines 200.

In this networked multi-player game system, when a real-time game is being played at the game machines 200, the same game images are displayed simultaneously on the game machines 200 and it is necessary to synchronize those game images.

However, a game image could be a special image where compression is not particularly effective, giving it a compression ratio that is extremely bad in comparison with a normal game image.

Figure 2:
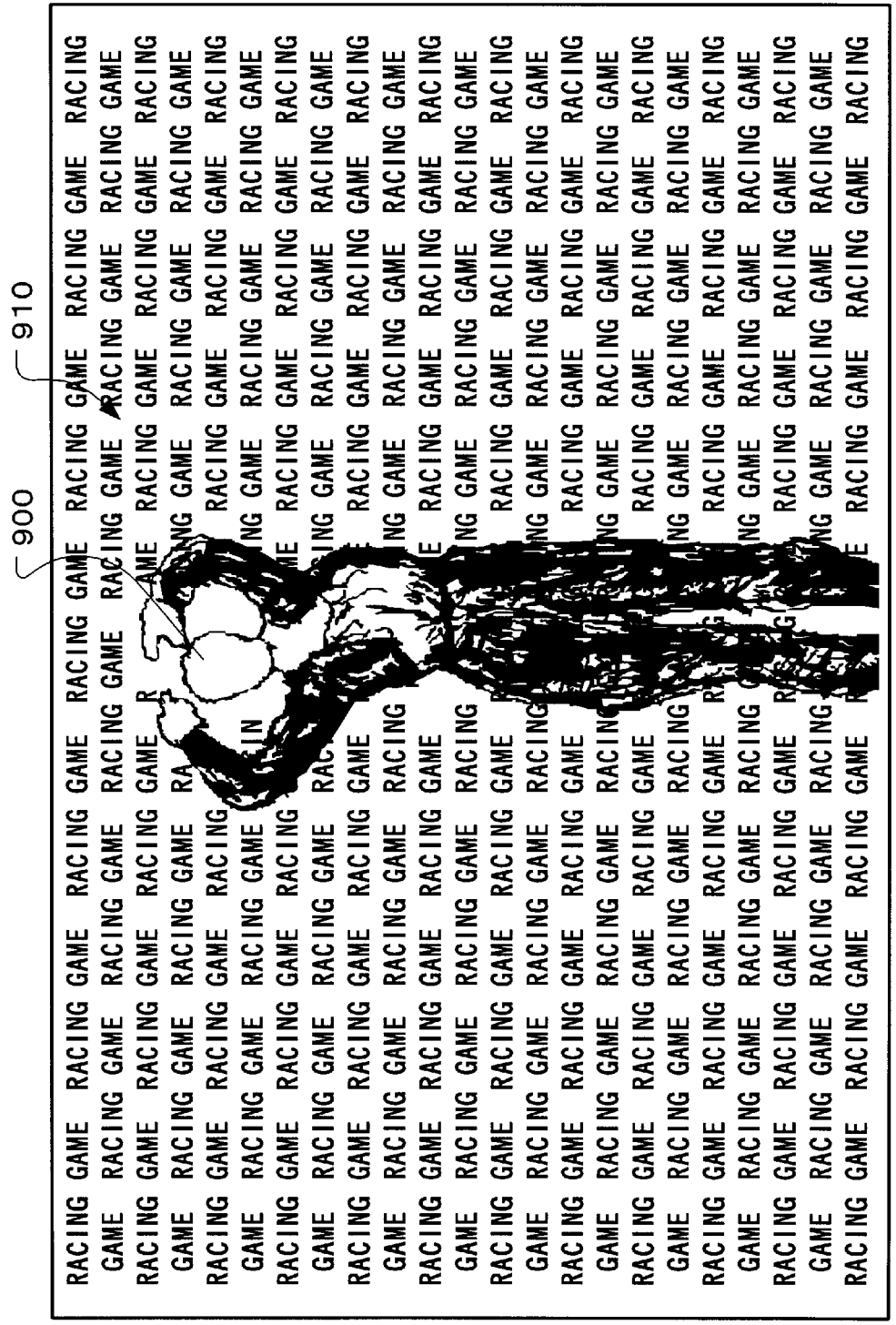
FIG. 2 shows an example of a special image from amongst game images.

An example of a special image from amongst the game images is shown in FIG. 2.

Compression does not work very well for a game image having a character 900 disposed at the center and a background filled with an alphanumeric string 910, as shown in FIG. 2, in other words, when there is a game image having many sections in which the properties (such as lightness, chroma, and luminance) of adjacent pixels are greatly different. If a compression method such as JPEG is used, it is difficult for such compression to work with an image in which the digitized data has dramatic changes, such as that shown in FIG. 2.

If the compression is adjusted to match the transfer bandwidth of the communications line 300, to enable a state in which an image with a bad compression ratio can be transferred, the quality of the game images will deteriorate.

To ensure that the game machines 200 can display agreeable game images in such a case, it is necessary to perform some sort of exceptional processing that is different from normal image processing.

One technique for such exceptional processing is a technique of determining that data is for a special image, based on the contents of the image, but a technique that bases the determination upon the contents of the image would demand a large load for the determination processing, which would extend the determination time.

This invention mainly employs a technique of determining from the volume of data after image compression whether data is of a special image.

Note that in this case, special images include a game entry image, a demo image, a high-score image, or an attraction image, by way of example. Note also that a special image could be a still image or a moving image.

Such images are predetermined images that have been set previously for display. If there is no change in the special image, therefore, that special image can be stored on the reception side beforehand, then read out as necessary for display, without having to be transferred.

In this case, the present invention uses a technique by which special image data is stored in a storage area on the reception side in advance, as the technique for displaying a special image.

The present invention is described below with reference to an example in which it is applied to a game system for a networked racing game that uses an ATM network to transfer data in cell form.

First Embodiment

Figure 3:
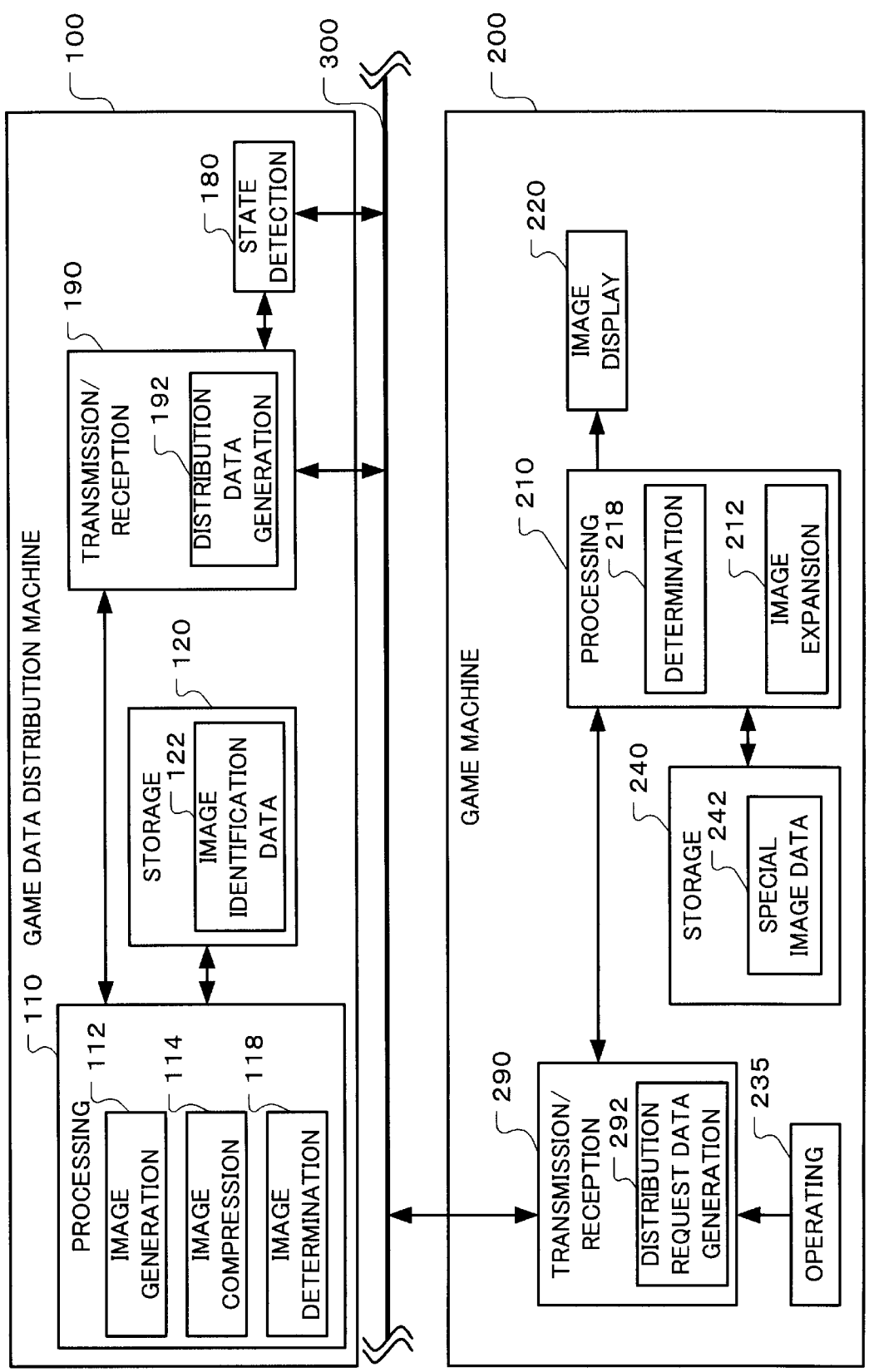
FIG. 3 is a functional block diagram of a game data distribution machine and a game machine in accordance with one embodiment of this invention.

A functional block diagram of the game data distribution machine 100 and the game machines 200 in accordance with a first embodiment of this invention is shown in FIG. 3.

The game data distribution machine 100 comprises a transmission/reception section 190, which receives distribution request data that comprises a player's operating information that is sent from one of the game machines 200 and transmits game image data to the game machine 200 that transmitted that distribution request data, a processing section 110 for generating and compressing game image data, and a storage section 120 for storing various items of information.

The transmission/reception section 190 assembles cells as distribution data and disassembles cells as distribution request data. The transmission/reception section 190 comprises a distribution data generation section 192 that generates the distribution data. The functions of the transmission/reception section 190 could be implemented by means such as an ATM switch.

The processing section 110 performs the various processes required for tasks such as overall control over the game data distribution machine 100, the issue of instructions to the various portions within the game data distribution machine 100, and game computations. The processing section 110 comprises an image generation section 112 that performs game computations based on distribution request data, to generate game images; an image compression section 114 that compresses the thus-generated game image data; and an image determination section 118 that determines whether or not the compressed game image data is special image data. The functions of the processing section 110 could be implemented by hardware such as a CPU, DSP, or ASIC, or by a given program (game program).

The storage section 120 comprises a predetermined storage area to act as a work area for the processing section 110. The storage section 120 contains image identification data 122 for determining whether or not there is a special image. The functions of the storage section 120 could be implemented by hardware such as ROM or RAM. Functions such as the transfer of data to the storage section 120 are performed by the processing section 110.

Each of the game machines 200 comprises an operating section 235 that generates operating information, based on the player's operations; a transmission/reception section 290 that transfers data; a processing section 210 that processes data; a storage section 240 that contains various items of data; and an image display section 220 that displays game images.

The operating section 235 generates operating information from operations performed by the player using controls such as buttons, a steering wheel, a throttle, an accelerator, a clutch, and a brake, and the operating information obtained by the operating section 235 is transferred to the transmission/reception section 290.

The transmission/reception section 290 assembles cells as distribution request data and disassembles cells as distribution data. The transmission/reception section 290 comprises a distribution request data generation section 292 that generates distribution request data, based on operating information that is transferred from the operating section 235. The functions of the transmission/reception section 290 could be implemented by means such as an ATM switch.

The processing section 210 performs the various processes required for tasks such as overall control over the game machine 200, the issue of instructions to the various portions within the game machine 200, and the expansion and transfer of game image data. The processing section 210 comprises a determination section 218, which identifies which special image to display, based on image identification data comprised within distribution data, and an image expansion section 212, which expands game image data from a compressed state. The functions of the processing section 210 could be implemented by hardware such as a CPU (either CISC or RISC), a DSP, or an ASIC, or by a given program (a game program).

The storage section 240 acts as a work area for the processing section 210. The storage section 240 is used for storing special image data 242. The functions of the storage section 240 could be implemented by hardware such as ROM or RAM.

The image display section 220 displays game images that have been expanded by the image expansion section 212. The functions of the image display section 220 could be implemented by hardware such as a display, an HMD, or a projector device.

The operation of these components will now be described, taking as an example the handling of the demo image of FIG. 2 as a special image and based on the flow of processing from the generation of an image in the game data distribution machine 100 to the display of the image in the game machines 200.

Figure 4:
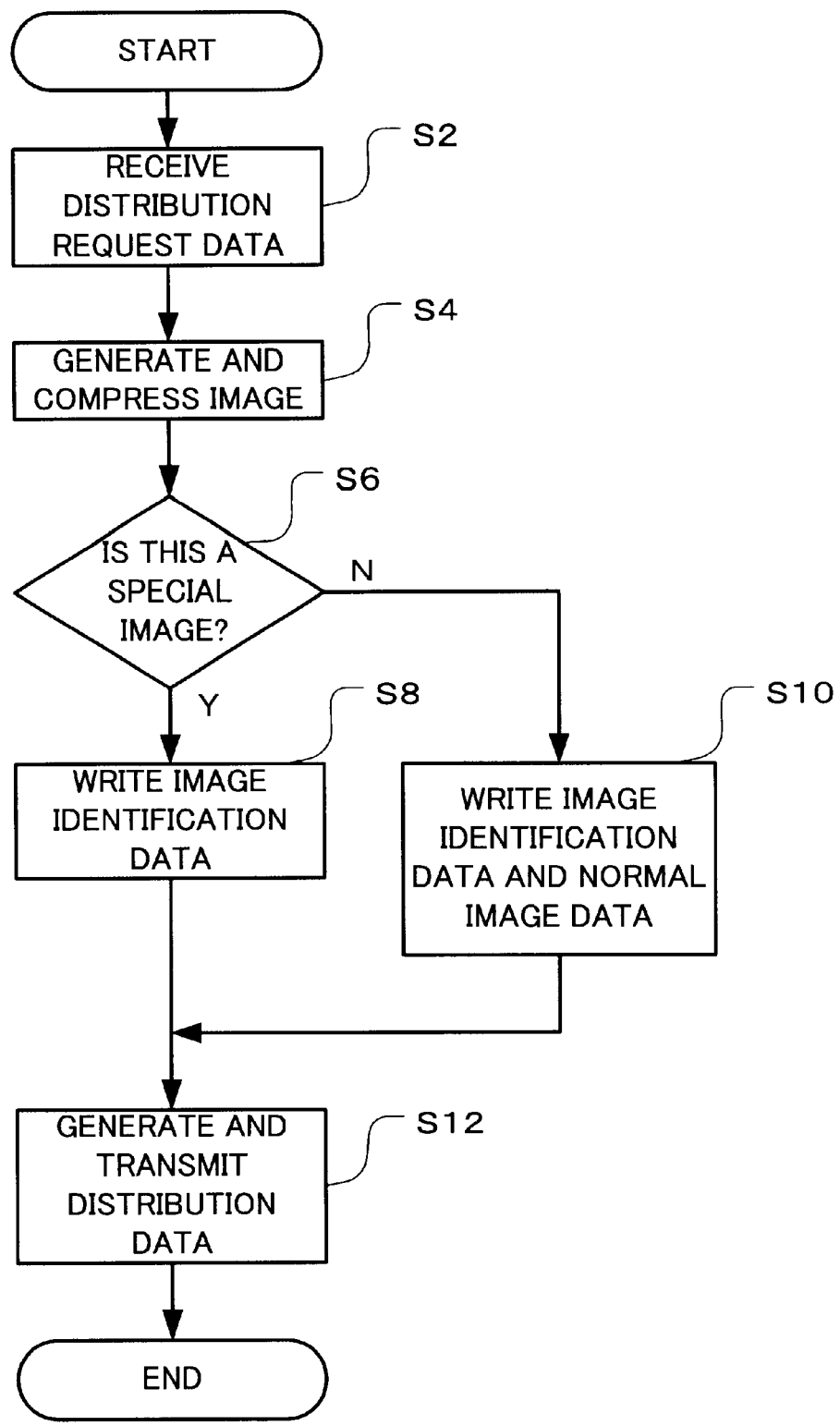
FIG. 4 shows an example of the flowchart of the processing performed by the game data distribution machine.

A typical flowchart of the processing of the game data distribution machine 100 is shown in FIG. 4.

A distribution request data for the demo image is sent to the game data distribution machine 100 over the communications line 300 which is a transmission path, either at the point at which the game ends in the game machines 200 or when the game machines 200 are activated.

First of all, the transmission/reception section 190 of the game data distribution machine 100 receives the distribution request data from the game machine 200 that specifies a request for the distribution of the demo image (step S2), the image generation section 112 generates game image data for displaying an image such as a demo image or a normal game image, based on that distribution request data, and the image compression section 114 compresses thus generated game image data (step S4).

The volume of the compressed game image data depends on the original image. In other words, an image that has large variations when digitized, such as that of the character 900 against a background filled with the alphanumeric string 910, shown in FIG. 2, or that of an image with violent changes in luminance in each frame, or an image that mixes bright colors and dark colors, will have a volume of data when compressed which is much greater than that of a normal image.

If the game image data for displaying such a special image is transferred as is, the resultant overflow of the transfer bandwidth will adversely affect the image quality of game images during the playing of a game on the game machine 200 that displays that special image, and this could also cause transfer delays.

It is therefore necessary to identify game image data having data volume that would exceed the data volume allotted to the transfer bandwidth after compression and distinguish between such game image data for a special image and normal game image data, in order to avoid image quality degradation, or transfer delays, for example.

The determination of whether or not compressed game image data is game image data for a special image is done by the image determination section 118 (step S6). The image determination section 118 determines whether an image is a special image or a normal image by checking whether or not the volume of the compressed game image data exceeds a predetermined value. In this case, a measure such as the transfer bandwidth or the size of an information region within an ATM cell can be used as this predetermined value.

Various techniques can be employed for handling the game image data for a special image, such as handling image units for each screen, sequences of moving image units such as those for a demo image, or predetermined units that are smaller than an image for a single screen, when an image for each screen is divided into several parts. Such techniques are used to ensure that the game image data is in similar units for comparison, so that the data volumes of the game image data will be different for normal images and special images.

The image determination section 118 in particular does not handle one entire image for a single screen of game image data; it extracts a feature portion that is a part thereof to determine an image. In this case, a feature portion is a portion that represents a feature of that image, which corresponds to a portion that changes a great deal, such as the background of a racing car in a racing game, not a portion that changes very little, such as a speedometer or ranking display. This determination by the feature portion ensures that the time taken for determining an image is shortened and the image determination processing can be done efficiently.

When the image distinction section 118 determines that game image data for a special image has been generated, the distribution data generation section 192 reads the image identification data 122 indicating that this is game image data for a special image from the storage section 120 and writes it to the distribution data (step S8). More specifically, the distribution data generation section 192 writes the image identification data 122 into a cell information region or a cell header, to indicate that this is game image data for a special image.

If this is not a special image (in other words, if this is game image data for a normal image), the distribution data generation section 192 reads from the storage section 120 the image identification data 122 that specifies this is game image data for a normal image and writes it to the distribution data, and also writes the normal image data itself into the distribution data (step S10).

The transmission/reception section 190 distributes the distribution data that comprises the image identification data 122 and other data to the game machine 200 that transmitted the distribution request data, over the communications line 300 (step S12).

In this manner, if the image is a special image, the game data distribution machine 100 does not distribute game image data itself to the game machines 200, but it distributes the image identification data 122 indicating that the data is game image data for a special image.

This makes it possible to reduce the likelihood of the special image data 242 monopolizing the transfer bandwidth of the communications line 300, which would cause delays in the transfer of normal game image data, for example.

This suppression of transfer delays in the normal game image data makes it possible for the game data distribution machine 100 to transfer the game image data to the game machine 200 within the planned transfer time, thus making it possible for the game machine 200 to display images at a suitable timing, so that the player can play an enjoyable game. This also makes it possible for the game data distribution machine 100 to provide various different games wherein real time image display is enabled.

In other words, it is substantially impossible in the art to distribute a special image such as that shown in FIG. 2, which has a large volume of data even after compression, to the game machines 200, because of transfer delays, for example. The present invention makes it possible for the game machines 200 to display game images that contain a mixture of normal game images and special images that involve large volumes of data, thus making it possible to provide a network type of game that enables various presentation techniques that are unknown in the art.

The description now turns to the flow of processing up to the display of game images on the game machine 200 side.

Figure 5:
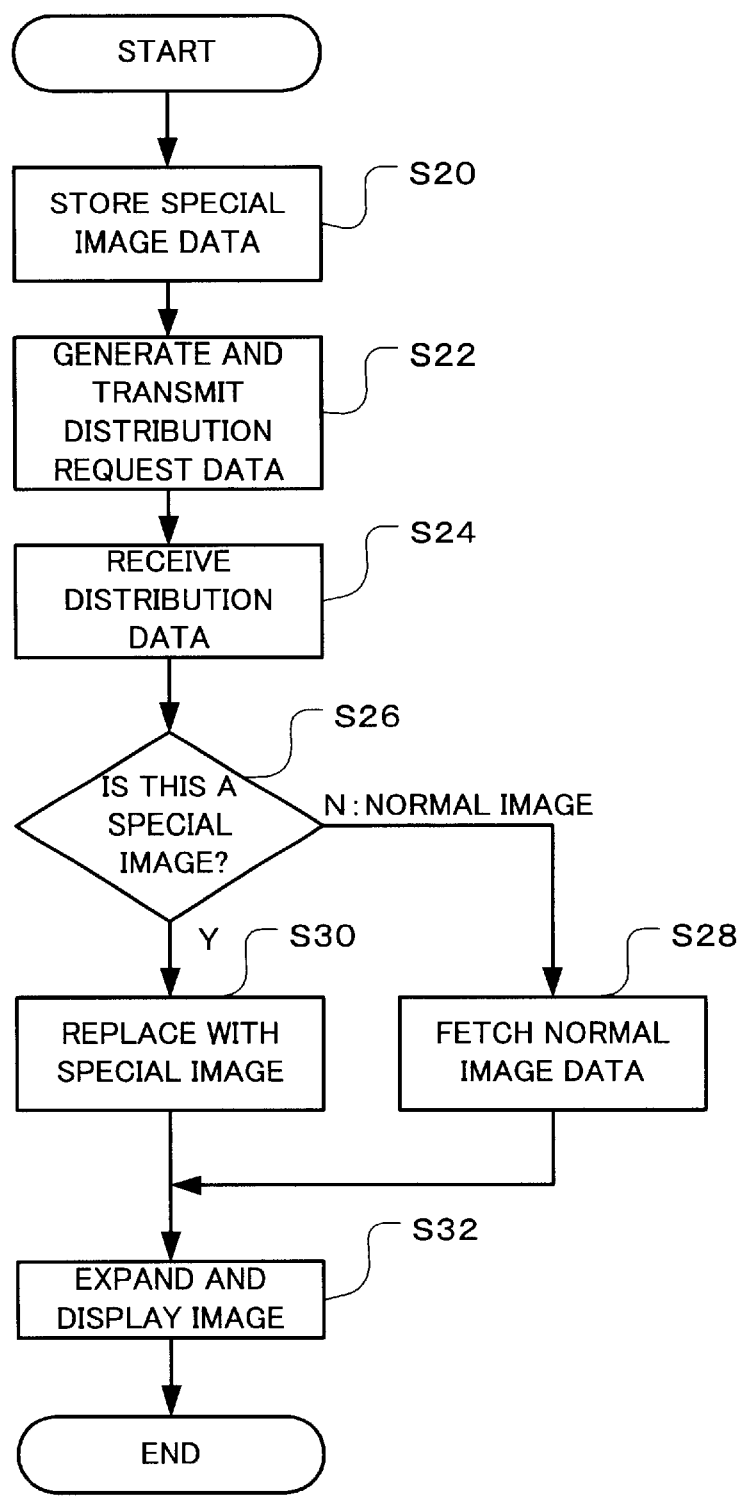
FIG. 5 is a flowchart of the processing up to game image display by the game machine.

A flowchart of this processing up to the display of game images by the game machine 200 is shown in FIG. 5.

The game machine 200 stores the special image data 242 in the storage section 240 before it starts transmitting and receiving data in real time, in other words, it gives precedence to the generation of distribution request data that comprises the player's operating information (step S20). Various techniques could be used for storing the special image data 242, such as a technique of writing to ROM within the game machine 200 before actual operation.

When the game machine 200 is connected to an ATM network by the communications line 300, the distribution request data generation section 292 is used to create distribution request data and the transmission/reception section 290 is used to transmit the distribution request data to the game data distribution machine 100 (step S22).

Note that during normal game presentation, the operating information that is generated by the operating section 235 in accordance with the player's actions is written to the distribution request data by the distribution request data generation section 292, and that distribution request data is transmitted to the game data distribution machine 100 by the transmission/reception section 290.

After the transmission of the distribution request data, the transmission/reception section 290 of the game machine 200 receives distribution data from the game data distribution machine 100 over the communications line 300 (step S24).

The determination section 218 determines the type of image by referencing the image identification data 122 that is comprised within the received distribution data. If the result of this determination is that this is a request for display of the special image data 242 (step S26), the processing section 210 reads the special image data 242 from the storage section 240 to replace normal image data with the special image data 242 (step S30).

After this replacement, the image expansion section 212 expands the special image data 242 and displays the special image on the image display section 220, based on the thus expanded special image data 242 (step S32).

Note that a plurality of types of image identification data 122 is provided, enabling the determination of a plurality of images from the plurality of sets of special image data 242 that are stored in the storage section 240 to correspond to that plurality of types of image identification data 122.

If this is a normal image that is not a special image, the transmission/reception section 290 extracts the normal game image data from the received distribution data (step S28), the image expansion section 212 expands that game image data, and the image display section 220 displays the normal game image, based on the thus expanded game image data (step S32).

By storing the special image data 242, which involves a large volume of data even when compressed, beforehand in the storage section 240 of the game machine 200 in this manner, it becomes possible to avoid transferring the special image data 242 so that the special image data 242 does not monopolize the transfer bandwidth, thus reducing transfer delays in the overall transfer of data. This enables the game player to play an agreeable network-type game in real time.

Note that it is also possible to add specific variations of the previously described special image data 242 for replacement, to each of the game machines 200. For example, commercials that are specific to site A or game image data that is specific to site A can be applied to the special image data 242 in the game machines 200-1 and 200-2 shown in FIG. 1. Similarly, commercials that are specific to site B or game image data that is specific to site B can be applied to the special image data in the game machines 200-3 and 200-4. This makes it possible to provide a game system that has a wide range of variety, for games that have strong regional followings, such as baseball or soccer.

With this embodiment of the invention, the method used for storing the special image data 242 in the storage section 240 is a method in which it is stored in a compressed state, but it is also possible to employ a method in which the data is stored in the storage section 240 after being expanded.

The above description related to a technique of implementing a game system that enables real-time game image display without having to transfer the special image data 242, but it is possible that it will become necessary to transfer the special image data 242 anyway. The description now turns to an embodiment of the invention wherein transfer of the special image data 242 is necessary.

Second Embodiment

Figure 6A:
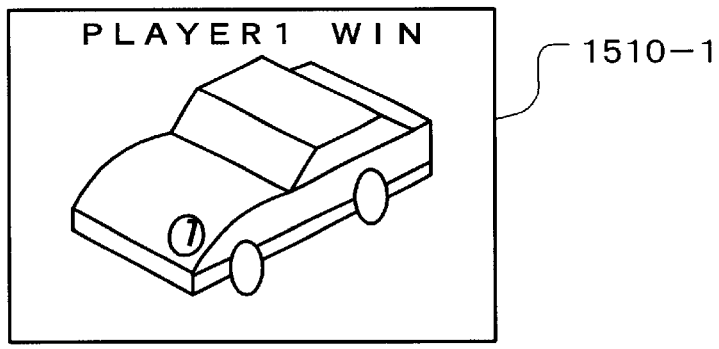
FIG. 6A shows the image displayed when player 1 has won.
Figure 6B:
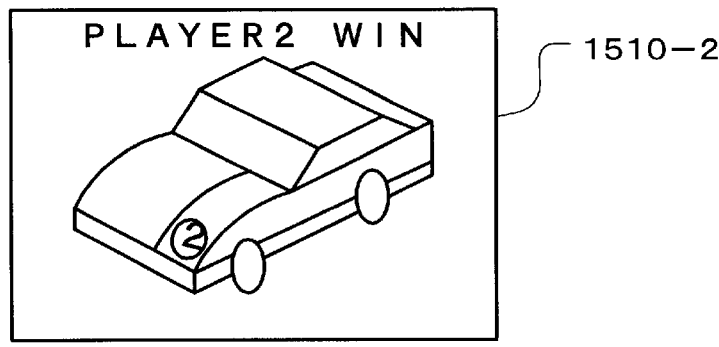
FIG. 6B shows the image displayed when player 2 has won.
Figure 6C:
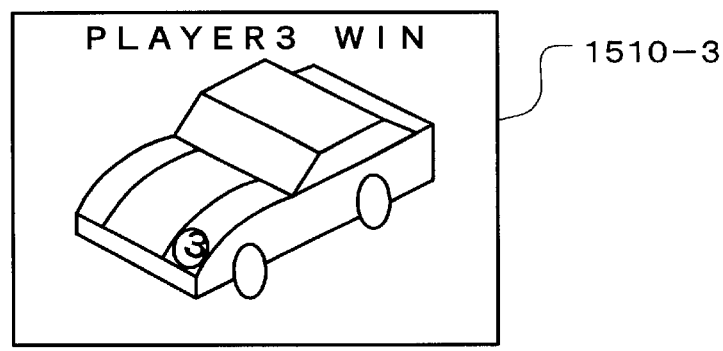
FIG. 6C shows the image displayed when player 3 has won.
Figure 6D:
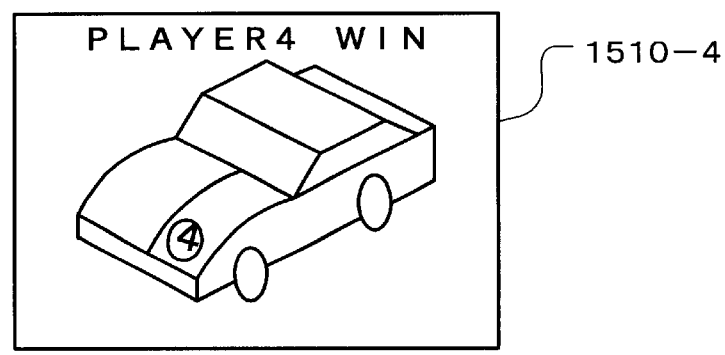
FIG. 6D shows the image displayed when player 4 has won.

Examples of images that are displayed when a winner has been determined in a racing game are shown in FIG. 6, where FIG. 6A shows an image 1510-1 that is displayed when player 1 has won, FIG. 6B shows an image 1510-2 that is displayed when player 2 has won, FIG. 6C shows an image 1510-3 that is displayed when player 3 has won, and FIG. 6D shows an image 1510-4 that is displayed when player 4 has won.

The images displayed after a win have been predetermined for display, so they are handled as special images. It is also possible to employ a technique of operation after they have been written to ROM in the game machine 200.

However, if there are changes in the specifications or the design of vehicles should change after the game machines 200 are shipped, it may become difficult to use the above described technique or it may be difficult to specify special images beforehand if one game machine is being used for various different games, as can happen with a domestic game machine.

This embodiment of the invention employs a technique of transferring a special image once, then not transmitting that special image subsequently, in order to accommodate such a case.

The description below exemplifies the display of the special image shown in FIG. 5, in a game system that comprises the game data distribution machine 100 and the game machines 200.

The game data distribution machine 100 also comprises a state detection section 180, in addition to the previously mentioned components shown in FIG. 3.

The state detection section 180 monitors the volume of data transferred over the communications lines 300, which are transmission paths, and detects the transfer state. The processing section 110 transmits distribution data to which the special image data 242 has been written, in a state in which a predetermined amount of space remains available within the transfer bandwidth of the communications line 300.

This ensures that there is sufficient space within the transfer bandwidth for the transfer of the special image data 242, so that the transfer of the other normal image data is not affected by the transfer of the special image data 242, thus making it possible to implement a real-time image display.

The description now turns to the operation of the components of this embodiment that are shown in FIG. 3, covering the flow of processing from image generation in the game data distribution machine 100 up to image display in the game machine 200.

Figure 7:
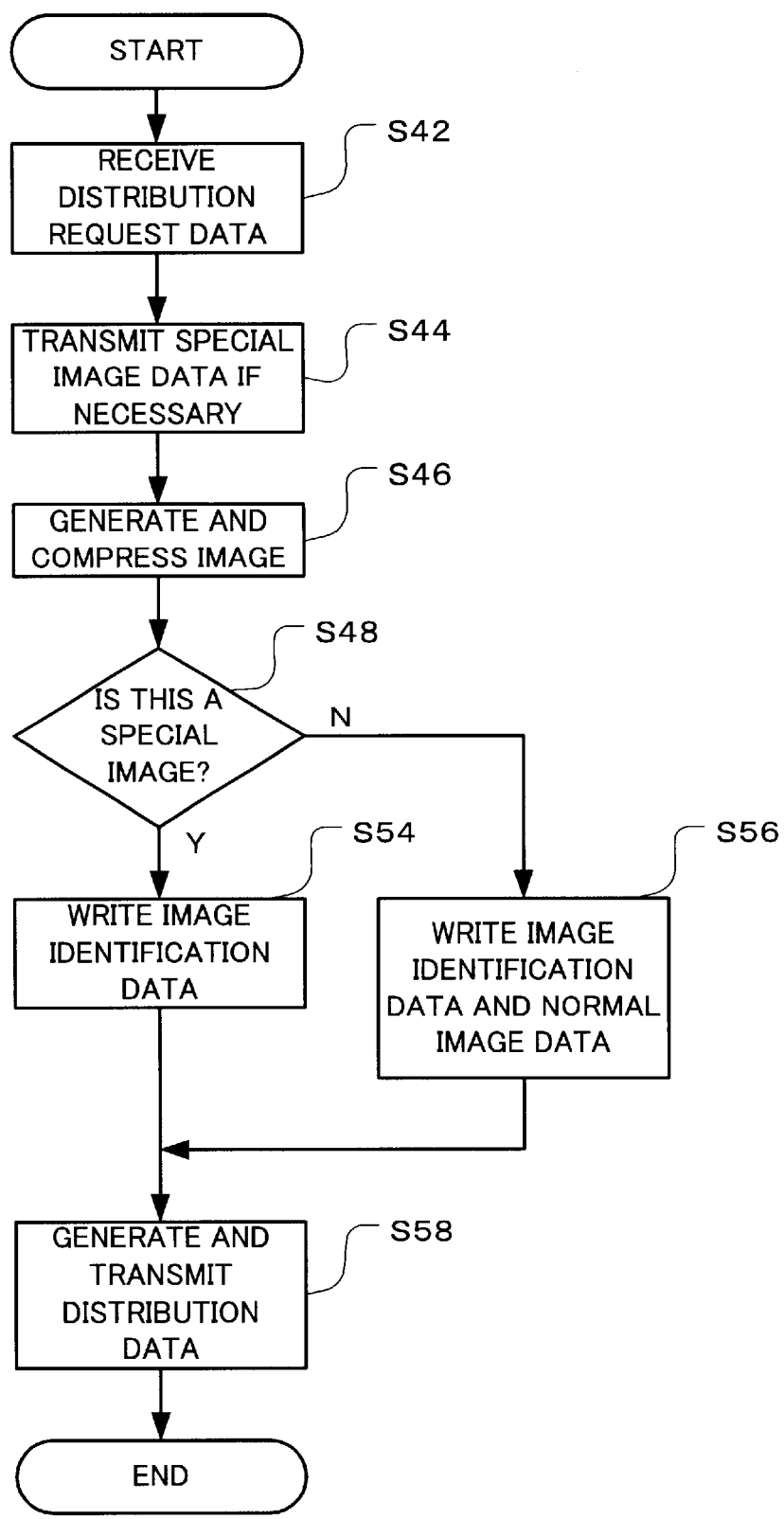
FIG. 7 shows an example of the flowchart of processing performed by a game data distribution machine 100.
Figure 9A:
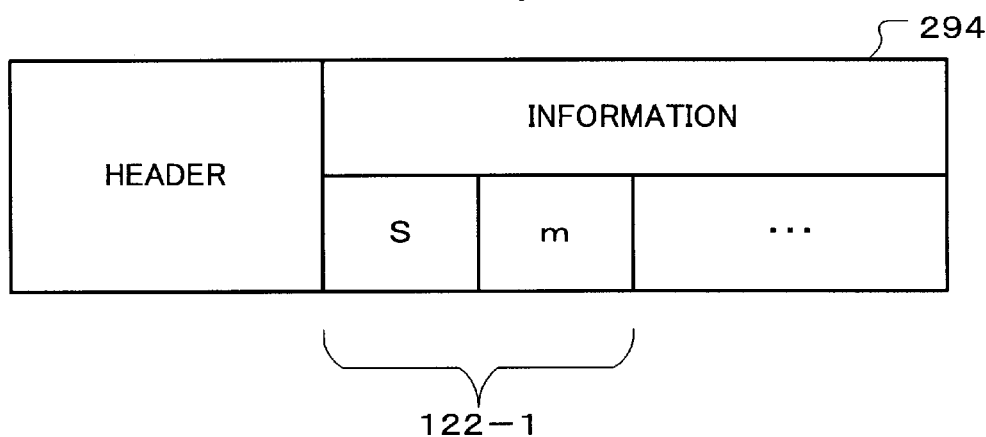
FIG. 9A shows distribution data that comprises image identification data during the initial transmission of the special image data.
Figure 9B:
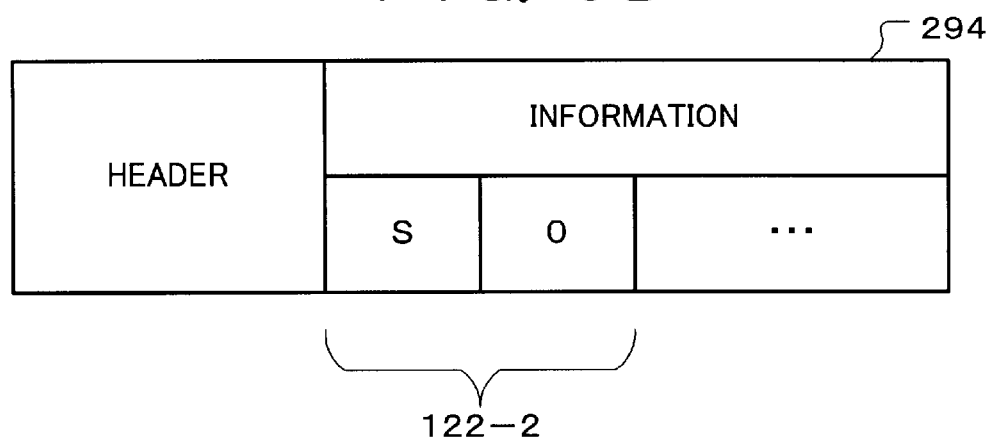
FIG. 9B shows distribution data that comprises image identification data during the second and subsequent transmissions of the special image data.
Figure 9C:
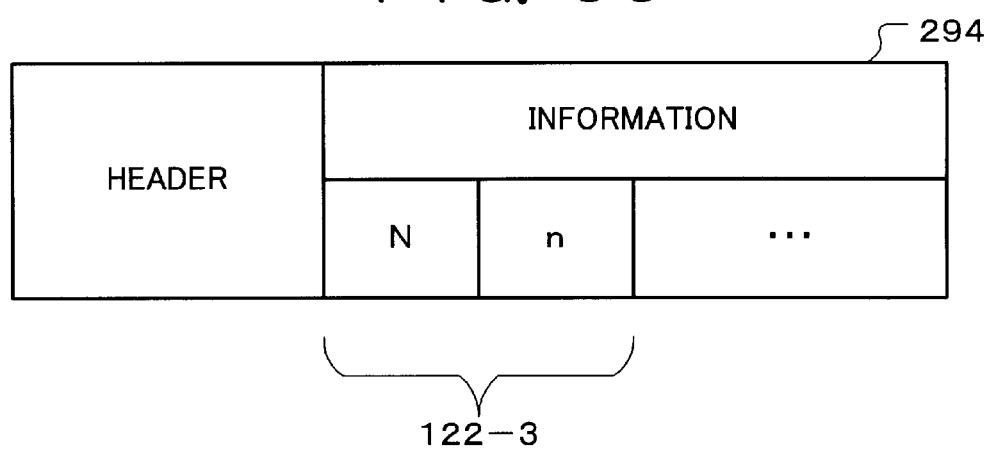
FIG. 9C shows distribution data that comprises image identification data during the transmission of normal image data.

A typical flowchart of the processing of the game data distribution machine 100 is shown in FIG. 7. The data structure of distribution data 294 is shown in FIG. 9, where FIG. 9A shows the distribution data 294 that comprises an image identification data item 122-1 during the initial transmission of the special image data 242, FIG. 9B shows the distribution data 294 that comprises an image identification data item 122-2 during the second and subsequent transmissions of the special image data 242, and FIG. 9C shows the distribution data 294 that comprises an image identification data item 122-3 during the transmission of normal image data.

First of all, the transmission/reception section 190 of the game data distribution machine 100 receives distribution request data from the game machine 200 (step S42). In this case, this reception of the initial distribution request data makes it possible to determine which of the game machines 200 is to receive distribution data.

At this point, the game data distribution machine 100 generates the special image data 242 if necessary and transmits it to the game machine 200 that transmitted that distribution request data (step S44). More specifically, the image generation section 112 generates the special image data 242 and the image compression section 114 compresses the special image data 242.

The image determination section 118 determines that the game image data is the special image data 242 from the time taken to generate and compress that game image data, then the distribution data generation section 192 generates distribution data that comprises the image identification data item 122-1, which specifies the distribution of the special image data 242 that is stored in the storage section 120, and the compressed special image data 242, based on this determination information. The transmission/reception section 190 then transmits that distribution data 294. In this case, the image identification data item 122-1 is denoted by the letter S to indicate that this is a special image, and the data length of the special image data 242 is denoted by m.

In other words, the state at this point is such that the system has been activated, it is before the transfer of the game image data that is necessary for real-time display, and there is sufficient space in the transfer bandwidth of the communications line 300. This state can be detected by the state detection section 180.

Note that if there is no such available space within the transfer bandwidth, the transmission of the special image data 242 is delayed until that space is freed. This enables the transmission of the special image data 242 beforehand by ensuring that images are fixed to a certain extent, but it also ensures that this transmission is done only when there is sufficient transfer bandwidth available, thus ensuring there is no obstruction of the transfer of normal game image data.

In this manner, there is substantially no effect on the actual game processing, because the transfer is done before the transfer of the game image data that requires real-time display, even if the transfer of the special image data has to wait until sufficient transfer bandwidth is available.

The game data distribution machine 100 performs normal game processing after the transmission of the special image data 242. In other words, the image generation section 112 generates the game image data on the basis of distribution request data then the image compression section 114 compresses that game image data (step S46). If the thus generated game image data is game image data for a special image (step S48), the distribution data generation section 192 reads the image identification data item 122-2 corresponding to that special image from the storage section 120 and writes it to the distribution data 294 (step S54), then the transmission/reception section 190 transmits that distribution data 294 to the game machine 200 (step S58). The image identification data item 122-2 in this case is denoted by the letter S indicating that it is a special image and the length of the special image data 242 is 0. In other words, the special image data 242 has already been transmitted in this case, to the game data distribution machine 100 does not transmit the special image data 242 and thus the length of the image identification data item 122-2 is set to 0.

Note that if the game data distribution machine 100 transmits game image data for a normal image, the distribution data generation section 192 writes the game image data together with the image identification data item 122-3 into the distribution data 294 (step S56), and the transmission/reception section 190 transmits that distribution data 294 to the game machine 200 (step S58). The image identification data item 122-3 in that case is denoted by the letter N to indicate that it is a normal image and the data length of the special image data 242 is n.

The description now turns to the flow of processing up to game image display in the game machine 200.

A flowchart of the flow of processing up to game image display in the game machine 200 is shown in FIG. 8.

When the game machine 200 is connected to an ATM network by the communications line 300, the distribution request data generation section 292 is used to generate distribution request data and the transmission/reception section 290 is used to transmit the distribution request data to the game data distribution machine 100 (step S62).

Note that during normal game presentation, the operating section 235 generates operating information, based on the player's operations, and the distribution request data generation section 292 generates distribution request data that comprises that operating information. The transmission/reception section 290 transmits that distribution request data to the game data distribution machine 100.

After the distribution request data is transmitted, transmission/reception section 290 of the game machine 200 receives the distribution data 294 from the game data distribution machine 100 over the communications line 300 (step S64).

The determination section 218 determines the type of image by referencing the image identification data 122 comprised within the thus received distribution data 294. If the determination section 218 determines that the distribution data 294 comprises the image identification data item 122-1 that contains the special image data 242 (step S66), the processing section 210 stores that special image data 242 in the storage section 240 (step S70). After that storage, the image expansion section 212 expands the special image data 242 if necessary, then the image display section 220 displays the special image, based on the thus expanded special image data 242 (step S76).

If the determination section 218 determines that the distribution data 294 comprises the image identification data item 122-3 that comprises normal image data (step S68), the normal image data is extracted from the distribution data (step S72).

That normal image data is expanded by the image expansion section 212 then is displayed by the image display section 220 (step S76).

If the determination section 218 determines that the distribution data 294 comprises a specification that the special image data 242 is to be distributed, but it also comprises the image identification data item 122-2 that does not contain the special image data 242 (step S68), the processing section 210 reads out the special image data 242 that has already been stored (step S74).

The thus read special image data 242 is expanded by the image expansion section 212 and is displayed by the determination section 218 (step S76). Note that if it is necessary to determine that there is a plurality of special images, it is possible for the processing section 210 to store a plurality of special image data items 242 corresponding to the types of image identification data 122 in the storage section 240.

If the above described processing is applied to the situation shown in FIG. 6, the state is such that four people are playing a multi-player racing game but it is not known which of players 1 to 4 will win. The victory image is predetermined but images change vigorously between frames. For that reason, such images correspond to special images.

The game data distribution machine 100 transfers game image data for displaying such special images to the game machines 200 where the players 1 to 4 will be playing, before the game starts. The game data distribution machine 100 transfers normal game image data after the game starts.

At the instant that it is determined that player 2 has won, by way of example, the game images to be displayed by the game machines 200 are replaced by the special image shown in FIG. 6B so that the image 1510-2 is displayed. This makes it possible for the same game image 1510-2 to be displayed in real time on all the game machines 200 simultaneously. By storing the special image data 242 in a predetermined storage area beforehand, it is also possible to display similar special images when any one of the other players 1, 3, or 4 wins.

Since the transfer of the special image data 242 is done at a suitable time such as when the system is activated in the game machines 200, this has substantially no effect on the transfer of normal game image data.

By storing the special image data 242, which involves a large volume of data when in a compressed state, beforehand in the storage section 240 of each game machine 200 in this manner, before the game image data that is necessary for real-time display is transferred, it is possible to reduce transfer delays in the overall data transfer without the special image data 242 monopolizing the transfer bandwidth. This enables game players to play an agreeable network-type game in real time.

In addition, it is possible for implement changes in the specifications of the special images in the game data distribution machine 100 on the distribution side, so that a single game machine such as a domestic game machine can be adapted in a suitable manner to various different games.

Although the above description concerned an example of a network type of game, this processing can also be implemented by using an information storage medium. The description now turns to an embodiment that enables such implementation.

Third Embodiment

A functional block diagram of a computer 500 that functions as a game data distribution machine and an information storage medium 600 is shown in FIG. 10.

The computer 500 comprises a processing section 510 that executes processing such as that for generating and compressing game images, a storage section 520 that stores various types of information, a transmission/reception section 550 that transmits and receives data such as stored images, and an information read-out section 590 that reads out information from the information storage medium 600. The components can be implemented by the hardware that was described with reference to the first embodiment, and the information read-out section 590 can be implemented by an optical reader such as an optical pickup section, a magnetic reader, or an I/O port.

The information storage medium 600 is a computer-readable information storage medium in which is stored information 610 for game data distribution, for generating game image data for a game that is presented in real time, and transmitting that data over the communications line 300 that is a transmission path.

In this case, the information 610 for game data distribution comprises determination information 612 for determining whether or not the game image data to be generated is the special image data 242 having a data volume that exceeds the predetermined data volume; information 614 for replacement that is used if the game image data has been identified to be the special image data 242, for writing image identification data 618 indicating that the game image data is the special image data 242 into the distribution data, instead of the game image data; and information 616 for transmission for transmitting that distribution data to the game machine in which that special image data 242 is stored. Note that the image identification data 618 is comprised within the information 614 for replacement.

The description now turns to the operation that takes place when the information storage medium 600 has been connected to the information read-out section 590 of the computer 500.

If the information storage medium 600 is connected to the information read-out section 590 of the computer 500, the information 610 for game data distribution, which comprises the determination information 612, the information 614 for replacement, and the information 616 for transmission, is read into the computer 500.

The reading in of the determination information 612 ensures that the processing section 510 can determine whether the received game image data is for displaying a normal image or for displaying a special image, by a technique that references the previously described data volume.

The reading in of the information 614 for replacement ensures that the image identification data 618 is simultaneously read in and the image identification data 618 is stored in the storage section 520.

If the processing section 510 has determined the thus generated game image data as game image data for displaying a special image, the image identification data 618 indicating that the game image data is the special image data 242 is written to the distribution data, instead of that game image data. Note that the image identification data 618 is similar to the image identification data items 122-1 to 122-3 shown in FIG. 9.

The reading of the information 616 for transmission causes the transmission/reception section 550 to take the distribution data that has been written to the image identification data 618 and transmit it to the game machine 200 at which the special image data 242 is stored.

The thus configured computer 500 can be implemented to have functions similar to those of the game data distribution machine 100 that was described with reference to the first embodiment.

It is also possible to implement functions that are similar to those of the game data distribution machine 100 that was described with reference to the second embodiment, when the determination information determines whether or not the thus generated game image data is the special image data 242 that requires a processing time longer than a predetermined processing time, and information for transmission that is used when the generated game image data is determined to be the special image data 242 writes that special image data 242 to the distribution data, transmits that distribution data to the game machine, and then transmits distribution data that comprises image identification data indicating that the game image data is the special image data 242 to the game machine, instead of the special image data 242 itself, for subsequent transmissions.

The description now turns to a computer 700 and an information storage medium 800 that function as the previously described game machine 200.

A functional block diagram of the computer 700 and the information storage medium 800 is shown in FIG. 11.

The computer 700 comprises a transmission/reception section 730 that transmits distribution request over the communications line 300 that is a transmission path and receives distribution data that comprises data such as game image data from the game data distribution machine 100, a processing section 710 that performs processing such as the expansion of compressed data and the transfer of data, a storage section 720 that acts as a work area for the processing section 710 and also accommodates various items of information, an image display section 750 that displays the game images that have been expanded by the processing section 710, and an information read-out section 790 for reading out information from the information storage medium 800.

These components can be implemented by the hardware that was described with reference to the first embodiment, and the information read-out section 790 can be implemented by an optical reader such as an optical pickup section, a magnetic reader, or an I/O port.

The information storage medium 800 is a computer-readable information storage medium in which is stored information 810 for game image display, for receiving distribution data that comprises game image data over the communications line 300 that is a transmission path, for the display of game images.

In this case, the information 810 for game image display comprises information 812 for storage, for taking the special image data 242 that is part of the game image data that has precedence over the reception of distribution data and storing that data in the storage section 720 before the game starts, and information 814 for replacement that is used if the received distribution data comprises predetermined image identification data, for reading the special image data 242 from the storage section 720 instead of the game image data and displaying that data. Note that the information 814 for replacement comprises image identification data 818 that is similar to the image identification data items 122-1 to 122-3 of FIG. 9.

The description now turns to the operation when the information storage medium 800 has been connected to the information read-out section 790 of the computer 700.

If the information storage medium 800 is connected to the information read-out section 790 of the computer 700, the information 812 for storage and the information 814 for replacement are read into the computer 700.

The reading of the information 812 for storage makes it possible for the processing section 710 to store the special image data 242 in the storage section 720 before the game starts, in precedence over the reception of the distribution data.

The reading of the information 814 for replacement ensures that the image identification data 818 is read and stored in the storage section 720 simultaneously.

If it has been determined that the distribution data that has been received by the transmission/reception section 730 is the predetermined image identification data 818, the processing section 710 reads the special image data 242 that has been stored in the storage section 720 beforehand, instead of the game image data.

The image display section 750 then displays the special image, based on that special image data 242.

The thus configured computer 700 can be implemented to have functions similar to those of the game machine 200 that was described with reference to the first embodiment.

Similarly, it is also possible to implement functions that are similar to those of the game data distribution machine 100 that was described with reference to the second embodiment, by employing an information storage medium which comprises information for storage that is used when distribution data comprising the special image data 242 has been received, for storing the special image data 242 in the storage section 720, and information for replacement that is used when distribution data comprising predetermined image identification data indicating that this is the special image data 242 has been received, for reading the special image data 242 for display from the storage section 720 instead of the real-time image data, as information for game image display.

Note that the information storage medium 600 or 800 can also contain various other items of information, such as a program or data. The functions of the information storage medium 600 or 800 could be implemented by hardware such as an optical disk (CD-ROM or DVD-ROM), magneto-optic disk (MO), magnetic disk, magnetic tape, DAT, game cassette, IC card, or semiconductor memory.

The information 610 for game data distribution or the information 810 for game image display could also be embodied in a carrier wave. In other words, it is also possible to implement the previously described various functions by downloading the information 610 for game data distribution or information 810 for game image display from a host device, by way of example.

The above descriptions concerned examples of a networked game, but the present invention can also be applied to general image processing such as that in an image display system. The description now turns to an example in which the present invention is applied to an image display system.

Fourth Embodiment

This embodiment can be applied by way of example to an image display system that receives distribution data that comprises image data over a transmission path from an image processing device and bases the display of images on that image data. The image display system comprises means for storing in a predetermined storage area the special image data 242 for displaying a predetermined special image, in precedence over the reception of the distribution data, and a display section for displaying the special image if the received distribution data comprises predetermined image identification data, where the display of this special image is based on the special image data 242 from the storage area, instead of the image data.

This configuration makes it possible for a device on the reception side of the distribution data to determine whether or not the special image data 242 is to be displayed, from image identification data comprised within the received distribution data, and reading the special image data 242 for the display of the special image from the predetermined storage area instead of from the distribution data.

If a technique of reading the special image data 242 were to be used instead, restrictions on the transfer bandwidth could impede the transfer of the special image data 242. This embodiment of the invention makes it unnecessary to transmit the special image data 242, thus enabling the enjoyment of real-time image display.

Modifications

Note that the applications of the present invention are not limited to the above described embodiments and thus it is possible to apply the present invention to various other modifications.

For example, the previously described embodiments dealt with a correspondence between a single special image and a single item of image identification data, but it is also possible to handle a plurality of special images simultaneously. In such a case, each of the plurality of special images would have a subtly different data volume, enabling determination of those special images, so that a method similar to those of previous embodiments can be employed if image identification data corresponding to each of those special images is provided.

If the special images are classified even more closely, the classification could be done by comparing the contents of the special image data.

The present invention is not limited to the previously described special images; similar effects can be obtained with images that enable a repeating display, when applied to images that have been determined beforehand for display. More specifically, these images could be commercial images such as advertisements.

The special images could be any images wherein real-time display is necessary, not just game images. For example, a situation could occur during a conflict between red and white teams where images celebrating the team that has won must be displayed in real time, regardless of whether the red team or the white team has won.

In such a situation, it is possible to employ a technique whereby both an image for when red has won and an image for when white has won are transferred to the reception side beforehand, those images are stored on the reception side, image identification data alone is transferred at the instant that the winning team is determined, and the image corresponding to that image identification data is displayed on the reception side.

In a situation that would incur transfer delays in the past, the employment of this method would make it possible to suppress transfer delays and enable real-time image display.

In addition, the game machines 200 are not limited to arcade game machines; they could also be domestic game machines. Note that the transmission path that is mentioned above is not limited to a physical wire such as an optical fiber cable; it could equally well be wireless means such as a satellite communications path or a wireless LAN.

What is claimed is:

1. A game system comprising:

a game machine for transmitting distribution request data and also displaying a game image based on predetermined distribution data, to present a game; and the distribution data machine for generating game image data, based on distribution request data that is transmitted over a transmission path from the game machine, and transmitting the game image data to the game machine;

wherein the game data distribution machine comprises:

means for receiving the distribution request data from the game machine;

means for generating game image data, based on received distribution request data; and means that operates if the thus generated game image data is special image data for the display of a predetermined special image, for generating distribution data that comprises image identification data indicating that the game image data is the special image data, and transmitting the generated distribution data to the game machine; and wherein the game machine comprises:

means for generating the distribution request data on the basis of operating information, transmitting the thus generated distribution request data to the game data distribution machine, and receiving the distribution data from the game data distribution machine;

means for determining an image type, based on the image identification data comprised within received distribution data; and means that operates if it has been determined that the special image data has been distributed, for displaying the special image, based on the special image data that has been stored in a predetermined storage area.

2. The game system as defined in claim 1, wherein the special image data is predetermined image data for real-time display.

3. A game system comprising:

a game machine for transmitting distribution request data and also displaying a game image based on predetermined distribution data, to present a game; and a game data distribution machine for transmitting to the game machine distribution data that comprises game image data which is generated on the basis of the distribution request data from the game machine that is transmitted over a transmission path;

wherein the game data distribution machine comprises:

means for receiving the distribution request data from the game machine;

means for generating the game image data, based on received distribution request data;

distribution-side determination means for determining whether or not the thus generated game image data is special image data for displaying a predetermined special image; and distribution-side transmission means that operates if it has been determined that the game image data has been the special image data, for generating distribution data that comprises the special image data, transmitting the distribution data to the game machine, further generating distribution data that comprises image identification data indicating that the game image data is the special image data instead of the special image data for subsequent transfers, and transmitting the distribution data to the game machine; and wherein the game machine comprises:

means for generating the distribution request data on the basis of operating information, transmitting the distribution request data to the game data distribution machine, and receiving the distribution data from the game data distribution machine;

means for storing in a predetermined storage area the special image data comprised within the distribution data that is transmitted from the game data distribution machine;

means for determining an image type, based on the image identification data comprised within received distribution data; and means that operates if it has been determined that the special image data has been distributed, for displaying the special image, based on the special image data stored in the storage area.

4. The game system as defined in claim 3, wherein the game data distribution machine further comprises means for compressing the game image data before the transmission of the distribution data; and wherein the game machine further comprises means for expanding the game image data comprised within received distribution data.

5. The game system as defined in claim 4, wherein the special image data has a data volume in a compressed state that exceeds the predetermined volume of compressed data for a normal image.

6. The game system as defined in claim 3, wherein the game data distribution machine further comprises means for monitoring the volume of data transferred over the transmission path and detecting a transfer state; and wherein the distribution-side transmission means transmits distribution data that comprises the special image data in a state in which a predetermined amount of space remains available in a transfer bandwidth within the transmission path.

7. The game system as defined in claim 3, wherein the distribution-side determination means comprises means for extracting a feature portion of the game image data, wherein the determination is based on the thus-extracted feature portion of the game image data.

8. A game data distribution machine for transmitting distribution data that comprises game image data over a transmission path, the game data distribution machine comprising:

distribution-side determination means for determining whether or not the game image data is special image data having a data volume that exceeds a predetermined volume of data; and distribution-side transmission means that operates if it has been determined that the game image data is the special image data, for generating the distribution data that comprises image identification data indicating that the game image data is the special image data instead of the game image data, and transmitting the distribution data to a game machine which stores the special image data and is presenting a game.

9. The game data distribution machine as defined in claim 8, further comprising, means for compressing the game image data before the transmission of the distribution data.

10. The game data distribution machine as defined in claim 8, wherein the special image data has a data volume in a compressed state that exceeds the predetermined volume of compressed data for a normal image.

11. The game data distribution machine as defined in claim 8, wherein the distribution-side determination means comprises means for extracting a feature portion of the game image data, wherein the determination is based on the thus-extracted feature portion of the game image data.

12. The game data distribution machine as defined in claim 8, further comprising, image generation means for generating the game image data, based on distribution request data from the game machine.

13. The game data distribution machine as defined in claim 12, wherein the distribution request data comprises operating information for the game machine; and wherein the image generation means performs game computations based on the operating information.

14. A game data distribution machine for transmitting distribution data that comprises game image data over a transmission path, the game data distribution machine comprising:

a distribution-side determination circuit for determining whether or not the game image data is special image data having a data volume that exceeds a predetermined volume of data; and a distribution-side transmission circuit that operates if it has been determined that the game image data is the special image data, for generating the distribution data that comprises image identification data indicating that the game image data is the special image data instead of the game image data, and transmitting the distribution data to a game machine which stores the special image data and is presenting a game.

15. A game data distribution machine for transmitting distribution data that comprises game image data over a transmission path to a game machine which is presenting a game, the game data distribution machine comprising:

determination means for determining whether or not the game image data is special image data that requires a processing time longer than a predetermined processing time; and means that operates if it has been determined that the game image data is the special image data, for generating the distribution data that comprises the special image data, transmitting the distribution data to the game machine, further generating distribution data that comprises image identification data indicating that the game image data is the special image data instead of the special image data for subsequent transfers, and transmitting the distribution data to the game machine.

16. The game data distribution machine as defined in claim 15, wherein the special image data is predetermined image data for real-time display.

17. The game data distribution machine as defined in claim 15, further comprising:

means for monitoring the volume of data transferred over the transmission path and detecting a transfer state, wherein the distribution-side transmission means transmits distribution data that comprises the special image data in a state in which a predetermined amount of space remains available in a transfer bandwidth within the transmission path.

18. The game data distribution machine as defined in claim 15, further comprising, image generation means for generating the game image data, based on distribution request data from the game machine.

19. The game data distribution machine as defined in claim 18, wherein the distribution request data comprises operating information for the game machine; and wherein the image generation means performs game computations based on the operating information.

20. A game data distribution machine for transmitting distribution data that comprises game image data over a transmission path to a game machine which is presenting a game, the game data distribution machine comprising:
  a determination circuit for determining whether or not the game image data is special image data that requires a processing time longer than a predetermined processing time; and
  a circuit that operates if it has been determined that the game image data is the special image data, for generating the distribution data that comprises special image data, transmitting the distribution data to the game machine, further generating distribution data that comprises image identification data indicating that the game image data is the special image data instead of the special image data for subsequent transfers, and transmitting the distribution data to the game machine.

21. A game machine that receives distribution data that comprises game image data over a transmission path from a game data distribution machine, to display a game image, the game machine comprising:
  means for determining whether or not received distribution data comprises image identification data indicating that the display of a predetermined special image is requested; and
  means that operates if it has been determined that the distribution data comprises the image identification data, for displaying the game image, based on special image data for displaying the special image that is stored in a predetermined storage area, instead of the game image data.

22. An image display system for receiving distribution data including predetermined image data over a transmission path from an image processing device, and for displaying a predetermined image, the image display system comprising:
  means for storing special image data for the display of a predetermined special image in a predetermined storage area before the reception of the distribution data;
  means for determining whether or not received distribution data comprises image identification data indicating that the display of the special image is requested; and
  means that operates if it has been determined that the distribution data comprises the image identification data identifying that the display of the special image is requested, for displaying the special image, based on the special image data in the storage area instead of the predetermined image data.

23. Computer-usable information embodied on an information storage medium or in a carrier wave, for transmitting distribution data that comprises game image data over a transmission path, the information comprising:
  determination information for determining whether or not the game image data is special image data having a data volume that exceeds a predetermined volume of data; and
  information that is used if it has been determined that the game image data is the special image data, for making transmission means transmit the distribution data that comprises image identification data indicating that the game image data is the special image data to a game machine at which the special image data is stored, instead of the game image data.

24. Computer-usable information as defined in claim 23, further comprising information for compressing the game image data before the transmission of the distribution data.

25. Computer-usable information as defined in claim 24, wherein the special image data has a data volume in a compressed state that exceeds the predetermined volume of compressed data for a normal image.

26. Computer-usable information as defined in claim 23, wherein the determination information further comprises:
  information for extracting a feature portion from the game image data; and
  information for determining the special image data, based on the thus-extracted feature portion of the game image data.

27. Computer-usable information embodied on an information storage medium or in a carrier wave, for transmitting distribution data that comprises game image data to a game machine over a transmission path, the information comprising:
  information for determining whether or not the game image data is special image data that requires a processing time longer than a predetermined processing time; and
  information for transmission that is used if it has been determined that the game image data is special image data, for making transmission means transmit the distribution data that comprises the special image data to the game machine, and for making the transmission means transmit the distribution data including image identification data indicating that the game image data is the special image data to the game machine, instead of the special image data, for subsequent transmissions.

28. The computer-usable information as defined in claim 27,
  wherein the special image data is predetermined image data for real-time display.

29. Computer-usable information as defined in claim 27, further comprising:
  information for monitoring the volume of data transferred over the transmission path and detecting a transfer state,
  wherein the information for transmission includes information for transmitting distribution data that comprises the special image data in a state in which a predetermined amount of space remains available in a transfer bandwidth within the transmission path.

30. Computer-usable information embodied on an information storage medium or in a carrier wave, for displaying a game image, based on distribution data that comprises game image data transferred over a transmission path from a game data distribution machine, the information comprising:
  information for previously storing special image data that is part of the image data in a predetermined storage area before the reception of the distribution data; and
  information that is used if received distribution data comprises predetermined image identification data, for displaying a special image, based on the special image data in the storage area instead of the game image data.

31. Computer-usable information embodied on an information storage medium or in a carrier wave, for displaying a game image, based on distribution data that comprises game image data transferred over a transmission path from a game data distribution machine, the information comprising:
  information for use if received distribution data includes special image data, for storing the special image data in a predetermined storage area; and
  information for use if received distribution data includes predetermined image identification data indicating that the game image data is the special image data, for displaying a special image, based on the special image data in the storage area instead of the game image data.

* * * * *